United States Patent
Nakabayashi et al.

(10) Patent No.: US 9,697,471 B2
(45) Date of Patent: Jul. 4, 2017

(54) DEVICE AND METHOD FOR MANAGING PLANT MODEL

(71) Applicant: Yokogawa Electric Corporation, Musashino-shi, Tokyo (JP)

(72) Inventors: Akio Nakabayashi, Tokyo (JP); Shouta Ukai, Tokyo (JP); Hidehiko Wada, Tokyo (JP); Tetsuya Otani, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 497 days.

(21) Appl. No.: 14/246,223

(22) Filed: Apr. 7, 2014

(65) Prior Publication Data

US 2014/0310228 A1    Oct. 16, 2014

(30) Foreign Application Priority Data

Apr. 12, 2013 (JP) .................................. 2013-084242

(51) Int. Cl.
*G06N 7/00* (2006.01)

(52) U.S. Cl.
CPC .................................... *G06N 7/005* (2013.01)

(58) Field of Classification Search
None
See application file for complete search history.

(56) References Cited

U.S. PATENT DOCUMENTS

| 5,353,207 A * | 10/1994 | Keeler | G05B 13/027 700/44 |
| 6,381,504 B1 * | 4/2002 | Havener | G05B 17/02 700/28 |
| 2006/0224254 A1 * | 10/2006 | Rumi | G05B 13/0275 700/28 |

FOREIGN PATENT DOCUMENTS

JP    2004-280450 A    10/2004

* cited by examiner

*Primary Examiner* — Alan Chen
(74) *Attorney, Agent, or Firm* — Westerman, Hattori, Daniels & Adrian, LLP

(57) ABSTRACT

A plant model management device according to one embodiment includes a generation unit and a combining unit. The generation unit receives a first set of prior probability distributions of a first set of automatic operation parameters. The first set of automatic operation parameters define a condition required for modeling a plant model that is a model based on data concerning a plant. The generation unit generates a first set of posterior probability distributions of the first set of automatic operation parameters and a first set of probabilistic plant models based on the first set of prior probability distributions. The first set of posterior probability distributions reflect compatibility with learning data that is past time-series data concerning a first explanatory variable and a first objective variable. The combining unit combines the first set of probabilistic plant models using the first set of posterior probability distributions to generate a first plant model.

20 Claims, 6 Drawing Sheets

DEVICE AND METHOD FOR MANAGING PLANT MODEL

BACKGROUND OF THE INVENTION

Field of the Invention

The present invention relates to a device and a method for managing plant models that are models based on data concerning plants.

Priority is claimed on Japanese Patent Application No. 2013-084242, filed Apr. 12, 2013, the content of which is incorporated herein by reference.

Description of the Related Art

Highly-sophisticated automatic operation using plant models, which are models based on data concerning plants, has been implemented in various plants, such as petroleum refining plants, petrochemical plants, basic chemical plants, paper manufacturing plants, and iron manufacturing plants. For example, model predictive control, operational optimization, and the like, have been performed. Regarding the model predictive control, a soft sensor (or inferential sensor) that predicts a value of a product quality indicator in real time using plant models is provided, and the manipulation amount for a plant is determined based on the predicted value of the product quality indicator. Regarding the operational optimization, the optimal operational condition is determined using plant models under economic or safety restrictions. Conventionally, measurement of the above product quality indicator value has been time-consuming. Recently, the product quality indicator value can be predicted in real time by the above soft sensor using the plant models, thereby enabling highly-sophisticated automatic operation with high precision.

Japanese Patent Laid Open Publication No. 2004-280450 (hereinafter, "Patent Document 1") discloses a device that automatically models plant models required for plant simulation. Specifically, the disclosed device includes: a modeling means that models behavior of a plant based on data to be used for modeling behavior of the plant; a input/output means that inputs/outputs the data to be used for modeling behavior of the plant, and the model resulting from the modeling; and a simulation means that simulates behavior of the plant based on the model for simulating behavior of the plant, which is modeled by the modeling means.

This device models behavior of the plant using a combination of an unsupervised learning algorithm such as a self-organizing map, a highly-expressive model such as an RBF (radial basis function) network, a method of optimizing parameters based on the least square criterion. Additionally, the behavior of the plant modeled in this manner is simulated based on a model for simulating that behavior of the plant, and update of the model is performed in accordance with a result of the simulation.

It seems to be possible to easily and freely model a desired plant model using the device disclosed in Patent Document 1. When a precise plant model is actually generated, however, work such as carefully considering parameters based on highly-specialized knowledge is required, thereby increasing the burden on a system user who generates a plant model.

For example, in a process of removing inadequate data from data required for generating a plant model, the system user has to define criteria for normal data (labeling). Generally, the labeling is difficult to perform in non-linear modeling. This is because a non-linear model has a high degree-of-freedom in the shapes of functions, and it is difficult to determine whether to use data out of the distribution of mainstream data in order to generate a plant model, or to remove the data (outlier determination).

For example, in a process using the aforementioned RBF network, a system user has to appropriately set the number of neurons. However, it is extremely difficult to determine the adequate number of neurons without careful consideration. Here, in a case where the set number of neurons is too large, a phenomenon called "over-fitting" occurs. Thus, a plant model reflecting generally-meaningless noise-level information is obtained, thereby greatly reducing the prediction performance of the aforementioned soft sensor or the like. On the other hand, in a case where the set number of neurons is too small, a phenomenon called "under-fitting" occurs. Thus, a plant model sufficiently reflecting the property of the plant cannot be obtained.

In a case where an adequate plant model is not generated, preferable prediction performance cannot be achieved after operation is initiated, thereby frequently requiring reconfiguration of a plant model. As explained above, a plant automatically operates based on the product quality indicator value predicted by the soft sensor. For this reason, in the above situation frequently requiring reconfiguration of a plant model, the availability of the plant is decreased, thereby finally causing a reduction in production efficiency.

SUMMARY

A plant model management device according to one embodiment of the present invention includes, but is not limited to, a generation unit and a combining unit. The generation unit is configured to receive a first set of prior probability distributions of a first set of automatic operation parameters. The first set of automatic operation parameters define a condition required for modeling a plant model. The plant model is a model based on data concerning a plant. The generation unit is configured to generate a first set of posterior probability distributions of the first set of automatic operation parameters and a first set of probabilistic plant models based on the first set of prior probability distributions. The first set of posterior probability distributions reflect compatibility with learning data. The learning data is past time-series data concerning a first explanatory variable and a first objective variable. The combining unit is configured to combine the first set of probabilistic plant models using the first set of posterior probability distributions to generate a first plant model.

A plant model management method according to another embodiment of the present invention includes, but is not limited to, the following processes. A first set of prior probability distributions of a first set of automatic operation parameters are received. The first set of automatic operation parameters define a condition required for modeling a plant model. The plant model is a model based on data concerning a plant. A first set of posterior probability distributions of the first set of automatic operation parameters and a first set of probabilistic plant models are generated based on the first set of prior probability distributions. The first set of posterior probability distributions reflect compatibility with learning data. The learning data is past time-series data concerning a first explanatory variable and a first objective variable. The first set of probabilistic plant models are combined using the first set of posterior probability distributions to generate a first plant model.

A method according to another embodiment of the present invention includes, but is not limited to, the following processes. A first set of parameters are sampled from a first parameter. A first set of probabilistic plant models are generated from the first set of parameters. A first weight is calculated based on the first set of probabilistic plant models. The first set of probabilistic plant models are combined using the first weight to generate a first plant model. A first predicted value of a first objective variable with respect to a first explanatory variable is calculated using the first plant model. Validity of the first plant model is verified based on the first predicted value and a first measured value of the first objective variable. The first measured value is a first value of the first objective variable actually measured. The first weight is updated to a second weight in a case that the first plant model is determined to be valid. The first set of probabilistic plant model is recombined using the second weight to generate a second plant model. A second predicted value of the first objective variable is calculated using the second plant model.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will now be described herein with reference to illustrative embodiments. The accompanying drawings explain a device and a method for managing plant models in the embodiments. The size, the thickness, and the like of each illustrated portion might be different from those of each portion of an actual semiconductor device.

Those skilled in the art will recognize that many alternative embodiments can be accomplished using the teachings of the present invention and that the present invention is not limited to the embodiments illustrated herein for explanatory purposes.

(Configuration of Plant Model Management Device)

Figure 1:
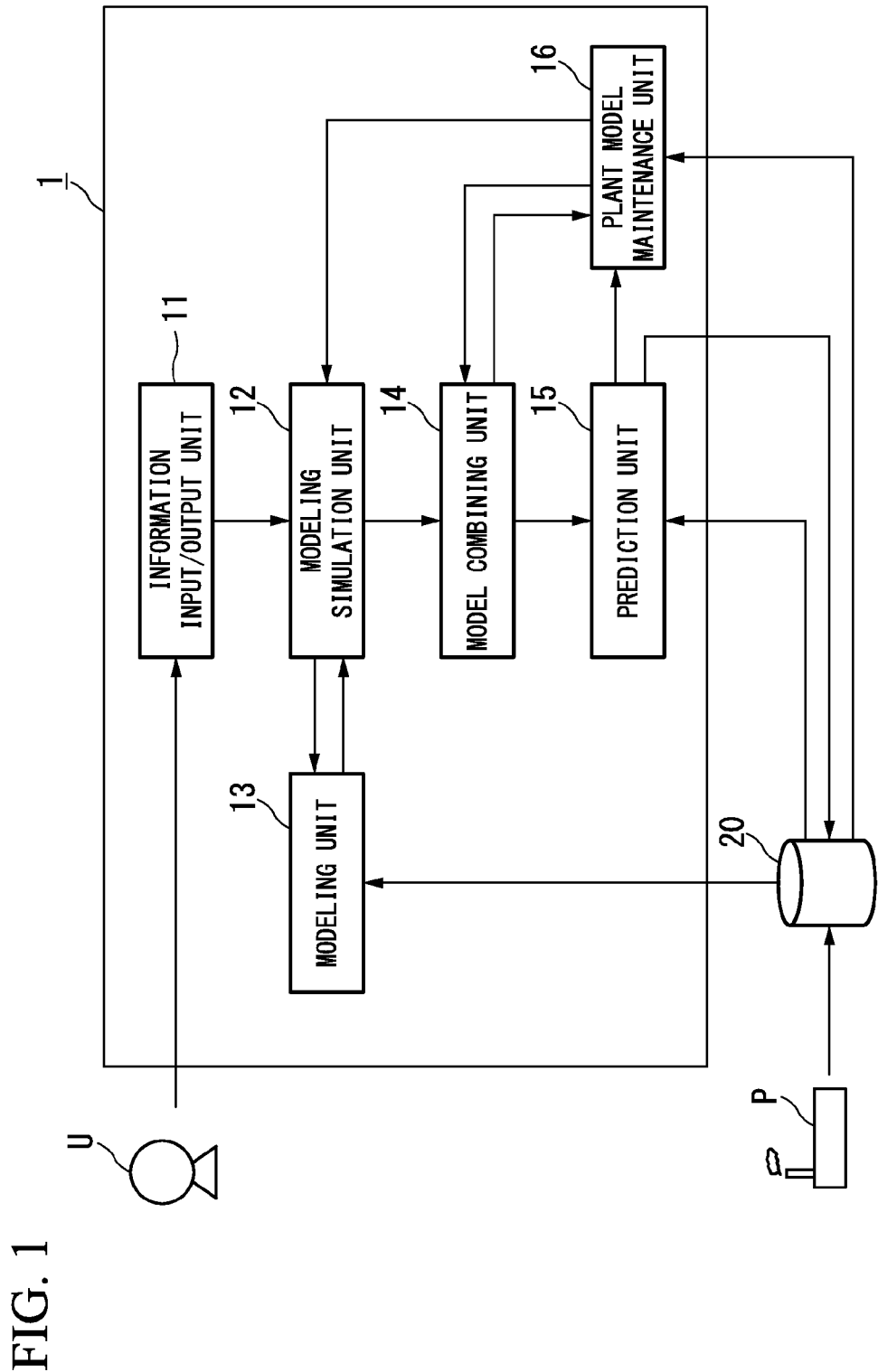
FIG. 1 is a block diagram illustrating a configuration of a main part of a plant model management device according to one embodiment of the present invention.

FIG. 1 is a block diagram illustrating a configuration of a main part of a plant model management device 1 according to one embodiment of the present invention. The plant model management device 1 manages plant models that are models based on data concerning a plant P. As shown in FIG. 1, the plant model management device 1 of the present embodiment includes: an information input/output unit 11; a modeling simulation unit 12; a modeling unit 13; a model combining unit 14; a prediction unit 15; and a plant model maintenance unit 16.

Here, the plant model management device 1 is implemented by a computer, such as a work station or a personal computer. Each block included in the plant model management device 1 (the information input/output unit 11; the modeling simulation unit 12; the modeling unit 13; the model combining unit 14; the prediction unit 15; and the plant model maintenance unit 16) is implemented by a computer reading software for implementing a function of the block, thus causing software and hardware resources to cooperate with each other.

The information input/output unit 11 inputs various information in accordance with operation of an input device (not shown), such as a keyboard or a mouse included in the plant model management device 1. Additionally, the information input/output unit 11 outputs various information to a display device (not shown), such as a liquid crystal display device included in the plant model management device 1. Specifically, the information input/output unit 11 inputs a prior probability distribution of an automatic operation parameter θ defining a condition required for modeling a plant model. Additionally, the information input/output unit 11 outputs to the display device, a predicted value of an objective variable and a probability distribution of that predicted value which are calculated by the prediction unit 15, and a result of evaluation of a probabilistic plant model performed by the plant model maintenance unit 16.

Here, the above automatic operation parameter θ includes, for example: information that specifies a model to be used for modeling a plant model (linear model, polynomial model, or the like); information that specifies the type of data to be used for modeling a plant model (temperature data, pressure data, or the like); information that distinguishes between normal data to be used for modeling a plant model and abnormal data to be removed (outlier determination information); information that specifies dynamic property, such as a delay or a wasted time, which is to be used for modeling a plant model; information that specifies time-dependent alteration, such as a time dependent change in a parameter to be used for modeling a plant model; and the like. Here, it is possible in the present embodiment to input a probability distribution (prior probability distribution) of each parameter included in the automatic operation parameter θ. For example, regarding a model to be used for modeling a plant model, a linear model can be used with the probability of ½, and a polynomial model can be used with the probability of ½.

The modeling simulation unit 12 receives the prior probabilities of the automatic operation parameter θ input to the information input/output unit 11. Additionally, the modeling simulation unit 12 sequentially outputs the automatic parameters θ to the modeling unit 13 and obtains probabilistic plant models therefrom, thus generating a set of the obtained probabilistic plant models. Further, the modeling simulation unit 12 calculates posterior probability distributions of the automatic operation parameters θ from likelihoods with respect to the automatic operation parameters θ. The modeling simulation unit 12 performs this operation in a case where a prior probability distribution of the automatic operation parameters θ is input to the information input/output unit 11, or in a case where an instruction is received from the plant model maintenance unit 16.

Specifically, the modeling simulation unit 12 samples the automatic operation parameters θ based on the prior probability distribution of the automatic operation parameter θ input to the information input/output unit 11, thus obtaining a set of automatic operation parameters $\{\theta_1, \ldots, \theta_N\}$ (where N is an integer greater than or equal to 2) to be output to the modeling unit 13.

The modeling simulation unit 12 sequentially outputs the sampled automatic operation parameters θ to the modeling unit 13, thus obtaining a set of probabilistic plant models shown in the following Expression (1) and a set of likelihoods of the automatic operation parameters θ shown in the following Expression (2).

[Expression 1]

$$\{p_{\theta_1}(y|x), \ldots, p_{\theta_N}(y|x)\} \quad (1)$$

[Expression 2]

$$\{p(Y|X, \theta_1), \ldots, p(Y|X, \theta_N)\} \quad (2)$$

The modeling simulation unit 12 performs a process of approximating the posterior probability distributions p(θ|X, Y) of the automatic operation parameters θ reflecting compatibility with the learning data X, Y (as will be explained in detail later), based on the set of likelihoods of the automatic operation parameters θ shown in the above Expression (2) (posterior probability distribution calculation process). Here, using the above Bayes' theorem, the posterior probability distributions of the automatic operation parameters θ can be described as the product of the posterior probability distribution and the likelihood, as shown in the following Expression (3)

[Expression 3]

$$p(\theta | X, Y) = \frac{p(Y | X, \theta)p(\theta)}{\int p(Y | X, \theta)p(\theta)d\theta} \quad (3)$$

Generally, it is difficult to strictly obtain the posterior probability distributions of the automatic operation parameters θ from the above Expression (3). For this reason, the modeling simulation unit 12 performs the above posterior probability distribution calculation process, thus approximating the posterior probability distributions of the automatic operation parameters θ. Here, the modeling simulation unit 12 outputs to the model combining unit 14, the calculated posterior probability distributions p(θ|X, Y) of the automatic operation parameters θ and the set of the probabilistic plant models shown in the above Expression (1).

Here, the method of sampling performed by the modeling simulation unit 12 may be determined by the experimental design method or the like, or probabilistically determined by the Monte Carlo method or the like. Additionally, a series of steps of sequentially outputting the automatic operation parameters θ to the modeling unit 13 and calculating the posterior probability distributions of the automatic operation parameters θ may be dynamically and repeatedly performed by the Markov Chain Monte Carlo method and various heuristics such as the genetic algorithm method. Further, any method may be used to approximate the posterior probability distributions of the automatic operation parameters θ in the above posterior probability distribution calculation process. For example, particle approximation may be performed based on the automatic operation parameters θ output to the modeling unit 13. The posterior probability distributions p(θ|X, Y) of the automatic operation parameters θ approximated in this manner can be expressed as the following Expression (4) using the Dirac delta function.

[Expression 4]

$$p(\theta | X, Y) \approx \sum_{n=1}^{N} \pi(\theta_n)\delta(\theta - \theta_n), \quad (4)$$

$$\pi(\theta) = \frac{p(Y | X, \theta)p(\theta)}{\sum_{n=1}^{N} p(Y | X, \theta_n)p(\theta_n)}$$

The modeling unit 13 generates a probabilistic plant model with respect to the automatic operation parameters θ received from the modeling simulation unit 12, using the learning data obtained from a data server 20. Additionally, the modeling unit 13 calculates likelihoods with respect to the automatic operation parameters θ. The modeling unit 13 performs this operation each time the automatic operation parameter θ is output from the modeling simulation unit 12.

Here, the data server 20 is a device that stores various data such as measurement data obtained from the plant P (explanatory variable), and data indicating quality or the like of a product produced at the plant P (objective variable), and the like, and provides the stored data in response to a request. The above learning data is time-series data (explanatory variable and objective variable) stored in the data server 20 up to the current time T to be used for modeling a plant model (explanatory variable $X=\{x_1, \ldots, x_T\}$, objective variable $Y=\{y_1, \ldots, y_T\}$).

Specifically, the modeling unit 13 generates a probabilistic plant model with respect to one of the automatic operation parameters θ output from the modeling simulation unit 12 (one probabilistic plant model included in the above Expression (1)), and calculates a likelihood with respect to the one of the automatic operation parameters θ (one likelihood included in the above Expression (2)). Here, assuming the independency of the data constituting the learning data, the likelihood with respect to the one of the automatic operation parameters θ can be obtained using the following Expression (5).

[Expression 5]

$$p(Y | X, \theta) = \prod_{t=1}^{T} p_\theta(y_t | x_t) \quad (5)$$

The modeling unit 13 outputs to the modeling simulation unit 12, the generated probabilistic plant models with respect to respective ones of the automatic operation parameters θ and the calculated likelihoods with respect to respective ones of the automatic operation parameters θ. Here, any method may be used to generate probabilistic plant models. For example, a potential variable indicating determination of abnormal data (outlier value determination) is introduced and then is estimated using parameters for a model and an optimization method, such as a maximum-likelihood method, thus enabling configuration of probabilistic plant models reflecting both the preprocessing and the modeling.

The model combining unit 14 combines the set of probabilistic plant models output from the modeling simulation unit 12, using the posterior probability distributions of the automatic operation parameters θ output from the modeling simulation unit 12. The model combining unit 14 performs this operation in a case where the posterior probability distributions of the automatic operation parameters θ and the set of probabilistic plant models are output from the modeling simulation unit 12, or in a case where a weight vector is output from the plant model maintenance unit 16 (as will be explained in the detail later).

Specifically, the model combining unit 14 calculates a weight vector $w=[w(\theta_1), \ldots, w(\theta_N)]$ to be used for combining the set of probabilistic plant models output from the modeling simulation unit 12. Each weight vector is calculated from the following Expression (6), using the posterior probability distributions $p(\theta|X, Y)$ of the automatic operation parameters θ output from the modeling simulation unit 12.

[Expression 6]

$$w(\theta) = \frac{p(\theta \mid X, Y)}{\sum_{n=1}^{N} p(\theta_n \mid X, Y)} \quad (6)$$

Additionally, the model combining unit 14 performs computation shown in the following Expression (7) using the weight vector w, thus combining the set of probabilistic plant models output from the modeling simulation unit 12.

[Expression 7]

$$p_{mix}(y \mid x) = \sum_{n=1}^{N} w(\theta_n) p_{\theta_n}(y \mid x) \quad (7)$$

The model combining unit 14 outputs the combined probabilistic plant models $p_{mix}(y|x)$ to the prediction unit 15, and outputs the weight vector w to the plant model maintenance unit 16. Here, in a case where the above computation shown in the Expression (7) is performed to combine the set of probabilistic plant models output from the modeling simulation unit 12, a probabilistic plant model determined to be inadequate may be removed before the combining process is performed.

The prediction unit 15 calculates a predicted value of an objective variable with respect to a new explanatory variable and a probability distribution of that predicted value of the objective variable, using the combined probabilistic plant models $p_{mix}(y|x)$ output from the model combining unit 14. The prediction unit 15 performs this operation at the time new measurement data or the like obtained from the plant P is stored in the data server 20 (at the time a new explanatory variable $x_t$ is obtained).

Here, the probability distribution of the predicted value of the objective variable can be described as $p(\hat{y}_t|x_t)$ where $\hat{y}_t$ denotes the predicted value of the objective variable with respect to the new explanatory variable $x_t$. Here, for a descriptive purpose, in the present specification, a symbol "ŷ" denotes a symbol obtained by appending a caret symbol "^" above the symbol "y". The prediction unit 15 outputs the calculated predicted value $\hat{y}_t$ of the objective variable to the data server 20, and outputs the probability distribution $p(\hat{y}_t|x_t)$ of the predicted value of the objective variable to the plant model maintenance unit 16.

Here, the reason that the prediction unit 15 outputs the calculated predicted value $\hat{y}_t$ of the objective variable to the data server 20 is to make the predicted value publicly available to an external system. Here, the combined probabilistic plant models $p_{mix}(y|x)$ output from the model combining unit 14 may be output to the external system. Additionally, the precision of the prediction (the degree of valuation of the predicted value) calculated using the probabilistic plant model may be output to the external system.

The plant model maintenance unit 16 verifies the validity of the combined probabilistic plant models $p_{mix}(y|x)$ output from the model combining unit 14, using the probability distribution of the predicted value of the objective variable calculated by the prediction unit 15 and an actual value of the objective variable (actually obtained value of the objective variable). Then, in accordance with a result of the verification, the plant model maintenance unit 16 updates the weight used for the combining process or instructs the modeling simulation unit 12 to regenerate a set of probabilistic plant models.

The plant model maintenance unit 16 performs this operation at the time new data indicating quality or the like of a product produced at the plant P is stored in the data server 20 (at the time a new actual value of the objective variable is obtained).

Specifically, the plant model maintenance unit 16 calculates a likelihood $p(y_t|x_t)$ of the actual value of the objective variable, using the actual value $y_t$ of the new objective variable stored in the data server 20 and the probability distribution $p(\hat{y}_t|x_t)$ of the predicted value of the objective variable output from the prediction unit 15 at the same point in time. Additionally, the plant model maintenance unit 16 verifies the validity of the currently-obtained combined probabilistic plant models $p_{mix}(y|x)$ based on the likelihoods obtained so far, and determines whether or not the combined probabilistic plant models $p_{mix}(y|x)$ is deteriorated.

In a case where it is determined that the combined probabilistic plant models is not deteriorated, the plant model maintenance unit 16 updates the weight vector $w=[w(\theta_1), \ldots, w(\theta_N)]$ used for combining the set of probabilistic plant models, and outputs the updated weight vector to the model combining unit 14. On the other hand, in a case where it is determined that the combined probabilistic plant models is deteriorated, the plant model maintenance unit 16 instructs the modeling simulation unit 12 to regenerate a set of probabilistic plant models.

Here, any method may be used to determine whether or not the combined probabilistic plant models is not deteriorated. For example, a configuration may be such that a threshold based on the likelihood at the time of learning is set to a sectionally-averaged value of likelihood or the like, thus performing the above determination. Alternatively, a configuration may be such that a result of the determination of whether or not the combined probabilistic plant models is deteriorated is output to the data server 20, thus making the result of the determination publicly available to an external system. Additionally, in a case where it is determined that the combined probabilistic plant models is deteriorated, the plant model maintenance unit 16 may give a notice to a system user U and request the system user U to update the prior probability distribution of the automatic operation parameters before giving an instruction to regenerate a set of probabilistic plant models. Further, any method may be used to update the weight vector. For example, a configuration may be such that the posterior probability distributions of the automatic operation parameters are updated using the likelihood with respect to the actual value, and then a weight vector is regenerated by the above method.

(Operation of Plant Model Management Device)

Next, operation of the plant model management device 1 is explained. Here, the operation of the plant model management device 1 mainly includes three operations which are "model generation operation", "prediction calculation operation", and "model maintenance operation". Hereinafter, outline of each operation is explained first, and then the details of each operation are explained.

The "model generation operation" is operation of generating a new probabilistic plant model based on an input prior probability distribution of automatic operation parameters θ, using all time-series data concerning an explanatory variable and an objective variable obtained up to the current time as learning data.

The "prediction calculation operation" is operation of calculating a predicted value of the objective variable with respect to the new explanatory variable and a probability distribution of that predicted value of the objective variable, using the probabilistic plant model generated by the above "model generation operation".

The "model maintenance operation" is operation of verifying the validity of the probabilistic plant model using the probability distribution of the predicted value of the objective variable calculated by the above "prediction calculation operation" and an actual value of the objective variable (actually obtained value of the objective variable), and performing maintenance of the probabilistic plant model (recombining and reconfiguration of the probabilistic plant model) in accordance with a result of the verification.

(Model Generation Operation)

Figure 2:
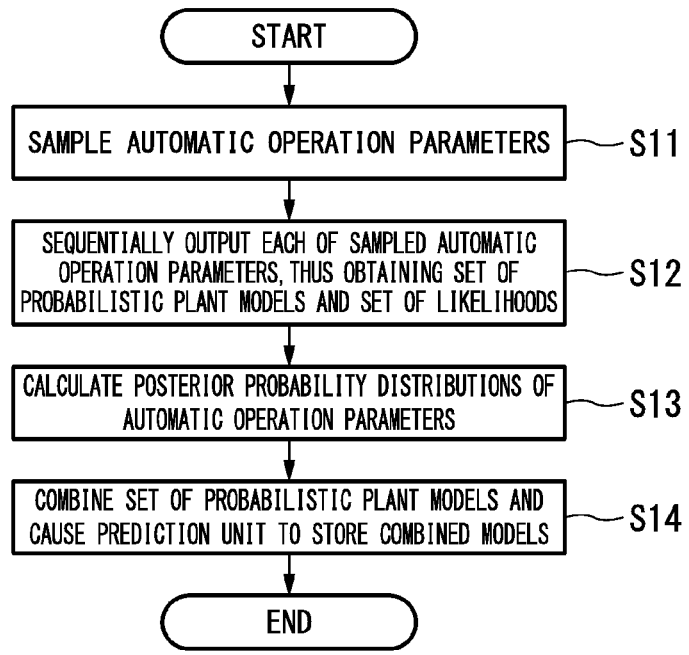
FIG. 2 is a flowchart illustrating a model generation operation to be performed by the plant model management device according to one embodiment of the present invention.

FIG. 2 is a flowchart illustrating the model generation operation to be performed by the plant model management device 1 according to one embodiment of the present invention. Here, the operation shown in the flowchart of FIG. 2 is initiated when a prior probability distribution of automatic operation parameters θ is input to the information input/output unit 11, or when an instruction is received from the plant model maintenance unit 16.

When the operation is initiated, the modeling simulation unit 12 performs a process of sampling automatic operation parameters θ based on the prior probability distribution of the automatic operation parameter θ input to the information input/output unit 11 (step S11). Thus, a set of automatic operation parameters $\{\theta_1, \ldots, \theta_N\}$ is obtained.

Then, the modeling simulation unit 12 performs a process of outputting to the modeling unit 13, each of automatic operation parameters θ, included in the set of automatic operation parameters $\{\theta_1, \ldots, \theta_N\}$ one by one. Thus, the modeling simulation unit 12 obtains a set of probabilistic plant models shown in the above Expression (1) and a set of likelihoods of automatic operation parameters θ shown in the above Expression (2) (step S12).

Here, each time the automatic operation parameter $\theta_i$ is output from the modeling simulation unit 12 to the modeling unit 13, the modeling unit 13 performs a process of generating a probabilistic plant model with respect to the automatic operation parameter $\theta_i$ and a process of calculating a likelihood with respect to the automatic operation parameter $\theta_i$, using the learning data obtained from the data server 20. The probabilistic plant models and the likelihoods obtained in those processes are sequentially output to the modeling simulation unit 12. Thus, the modeling simulation unit 12 obtains the set of probabilistic plant models shown in the above Expression (1) and the set of likelihoods of automatic operation parameters θ shown in the above Expression (2)

Then, the modeling simulation unit 12 performs a process of calculating posterior probability distributions of the automatic operation parameters θ (step S13). Specifically, based on the set of likelihoods of the automatic operation parameters θ obtained in step S12, the modeling simulation unit 12 performs a process of calculating posterior probability distributions of the automatic operation parameters θ reflecting the compatibility with the learning data. Here, the set of probabilistic plant models obtained in step S12 and the posterior probability distributions of the automatic operation parameters θ calculated in step S13 are output from the modeling simulation unit 12 to the model combining unit 14.

Then, the model combining unit 14 performs a process of combining the set of probabilistic plant models output from the modeling simulation unit 12 and causing the prediction unit 15 to store the combined probabilistic plant models (step S14). Specifically, the model combining unit 14 calculates the weight vector $w=[w(\theta_1), \ldots, w(\theta_N)]$ from the above Expression (6), using the posterior probability distributions of the automatic operation parameters θ calculated in step S13. Then, the model combining unit 14 performs the computation shown in the above Expression (7), using the calculated weight vector w, thus combining the set of probabilistic plant models. Here, the combined probabilistic plant models is output from the model combining unit 14 to the prediction unit 15. Thus, the prediction unit 15 stores the combined probabilistic plant models.

(Prediction Calculation Operation)

Figure 3:
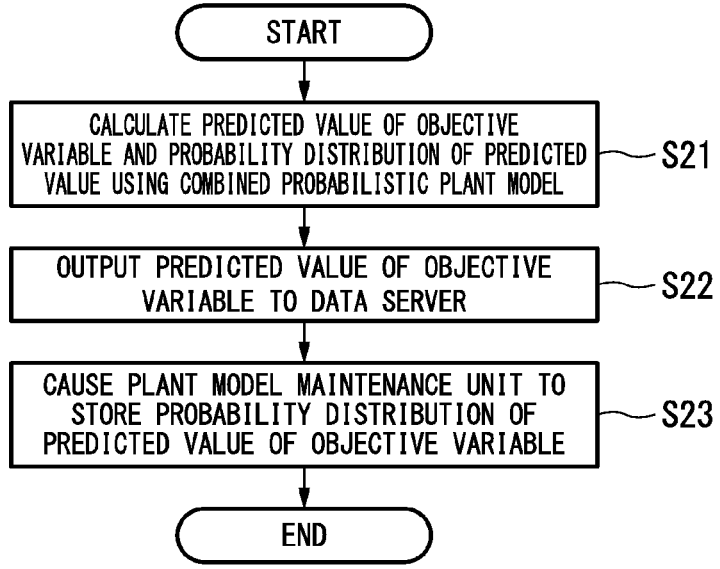
FIG. 3 is a flowchart illustrating a predictive calculation operation to be performed by the plant model management device according to one embodiment of the present invention.

FIG. 3 is a flowchart illustrating the prediction calculation operation to be performed by the plant model management device 1 according to one embodiment of the present invention. Here, the operation shown in the flowchart of FIG. 3 is initiated at the time new measurement data or the like obtained from the plant P are stored in the data server 20 (at the time a new explanatory variable $x_t$ is obtained).

When the operation is initiated, the prediction unit 15 performs a process of calculating a predicted value $\hat{y}_t$ of the objective variable with respect to the new explanatory variable and a probability distribution of that predicted value of the objective variable $p(\hat{y}_t|x_t)$, using the combined probabilistic plant models $p_{mix}(y|x)$ obtained by the above "model generation operation" (step S21). Then, the prediction unit 15 performs a process of outputting to the data server 20, the predicted value $\hat{y}_t$ of the objective variable calculated in step S21 (step S22). Thus, the predicted value $\hat{y}_t$ of the objective variable is made publicly available to an external system.

Then, the prediction unit 15 performs a process of outputting to the plant model maintenance unit 16, the probability distribution of the predicted value of the objective variable $p(\hat{y}_t|x_t)$ calculated in step S21 and causing the plant model maintenance unit 16 to store the probability distribution (step S23). Thus, the plant model maintenance unit 16 stores the probability distribution of the predicted value of the objective variable, which is calculated using the combined probabilistic plant models stored in the prediction unit 15.

(Model Maintenance Operation)

Figure 4:
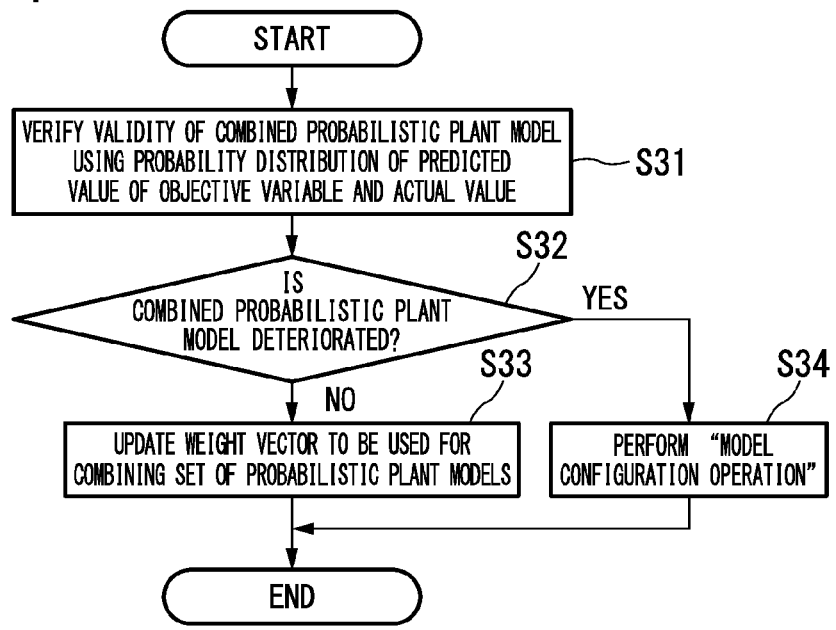
FIG. 4 is a flowchart illustrating a model maintenance operation to be performed by the plant model management device according to one embodiment of the present invention.

FIG. 4 is a flowchart illustrating the model maintenance operation to be performed by the plant model management device 1 according to one embodiment of the present invention. Here, the operation shown in the flowchart of FIG. 4 is initiated when new data indicating quality or the like of a product produced at the plant P is stored in the data server 20 (at the time a new actual value of the objective variable is obtained).

When the operation is initiated, the plant model maintenance unit 16 performs a process of verifying the validity of the currently-obtained combined probabilistic plant models $p_{mix}(y|x)$, using the new actual value $y_t$ of the objective variable stored in the data server 20 and the probability distribution of the predicted value of the objective variable $p(\hat{y}_t|x_t)$ at the same point in time (step S31). Specifically, the plant model maintenance unit 16 calculates a likelihood $p(y_t|x_t)$ of the actual value $y_t$ of the objective variable, using the above actual value $y_t$ of the objective variable and the above probability distribution of the predicted value of the objective variable $p(\hat{y}_t|x_t)$. Then, the plant model maintenance unit 16 verifies the validity of the currently-obtained combined probabilistic plant models $p_{mix}(y|x)$ based on the likelihoods obtained so far.

Then, the plant model maintenance unit 16 performs a process of determining whether or not the combined probabilistic plant models $p_{mix}(y|x)$ is deteriorated (step S32). If it is determined that the probabilistic plant model $p_{mix}(y|x)$ is not deteriorated (step S32: NO), the plant model maintenance unit 16 performs a process of updating the weight vector $w=[w(\theta_1), \ldots, w(\theta_N)]$ used for combining the set of probabilistic plant models and outputting the updated weight vector to the model combining unit 14 (step S33).

On the other hand, if it is determined that the combined probabilistic plant models $p_{mix}(y|x)$ is deteriorated (step S32: YES), the plant model maintenance unit 16 performs a process of instructing the modeling simulation unit 12 to regenerate a set of probabilistic plant models. Thus, the above "model generation operation" is performed (step S34).

(Combining and Recombining of Plant Models)

Figure 5A:
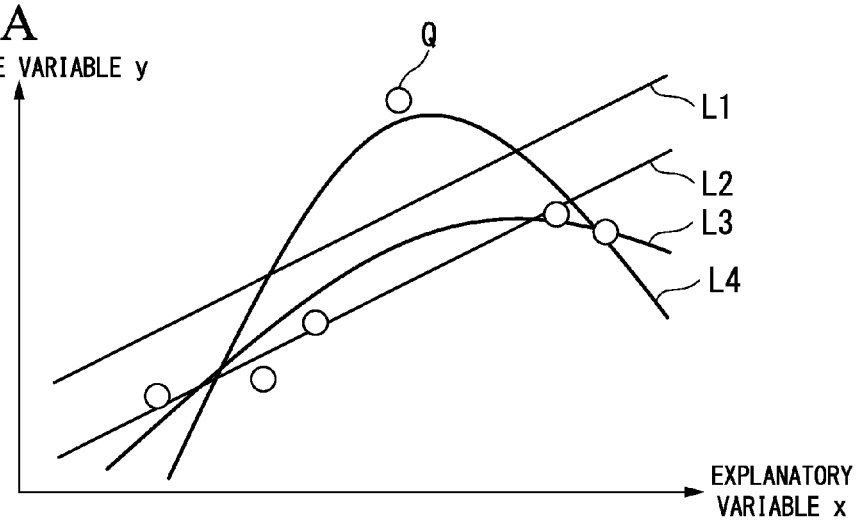
FIGS. 5A to 5C are graphs illustrating a model generation operation to be performed by the plant model management device according to one embodiment of the present invention.
Figure 5B:
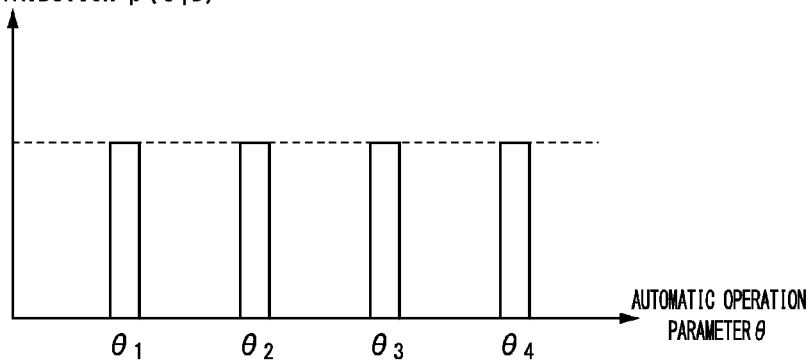
Figure 5C:
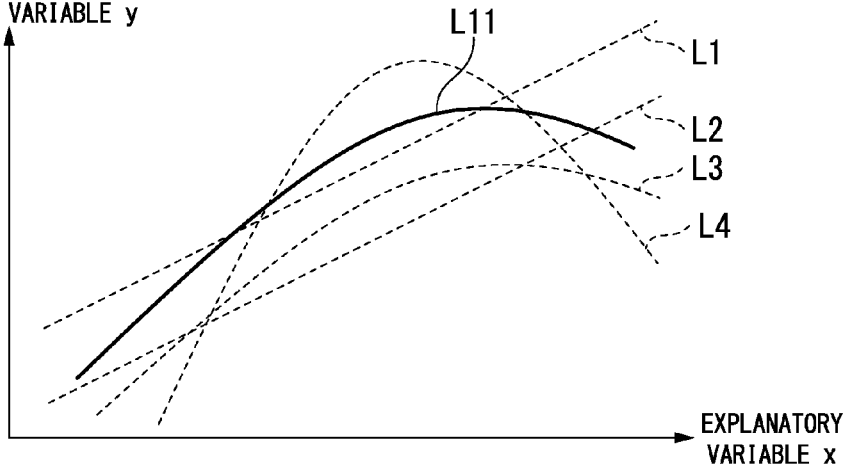

FIGS. 5A to 5B are graphs illustrating the model generation operation to be performed by the plant model management device 1 according to one embodiment of the present invention. FIG. 5A is a graph illustrating an example of a set of probabilistic plant models. FIG. 5B is a graph illustrating an example of posterior probability distributions. FIG. 5C is a graph illustrating an example of the combined probabilistic plant models. In FIGS. 5A and 5C, a horizontal axis denotes the explanatory variable x, and a vertical axis denotes the objective variable y. In FIG. 5B, a horizontal axis denotes the automatic operation parameter θ, and a vertical axis denotes a probability value of the posterior probability distribution.

The straight and curved lines appended with reference symbols L1 to L4 shown in FIGS. 5A and 5C denote expected values of the probabilistic plant models generated by the modeling unit 13 and obtained by the modeling simulation unit 12. The straight lines appended with reference symbols L1 and L2 denote expected values of the probabilistic plant models resulting from regression based on a linear model. Curved lines appended with reference symbols L3 and L4 denotes expected values of the probabilistic plant models resulting from regression based on a polynomial model. Here, the reason that the expected values of the probabilistic plant models are shown in FIGS. 5A and 5B is to simplify the illustration. The expected values of the probabilistic plant models with respect to the automatic operation parameters θ are calculated using the following Expression (8).

$$E_\theta(y|x) = \int y p_\theta(y|x) dy \quad (8)$$

The symbols indicated by white circles shown in FIG. 5A denote learning data. The probabilistic plant models achieving the expected values appended with the reference symbols L1 to L4 are generated so as to reflect the compatibility with those learning data. Here, regarding the probabilistic plant models achieving the expected values appended with the reference symbols L2 and L3, the learning data appended with the reference symbol Q is determined to be an outlier. On the other hand, regarding the probabilistic plant models achieving the expected values appended with the reference symbols L1 and L4, the learning data appended with the reference symbol Q is determined not to be an outlier.

The posterior probability distributions of the automatic operation parameters θ shown in FIG. 5B are generated by the modeling simulation unit 12, using the set of likelihoods of the automatic operation parameters θ generated by the modeling unit 13. Here, for simplification of explanation, it is assumed as shown in FIG. 5B that probability values of the posterior probability distributions of the four automatic operation parameters $\theta_1$ to $\theta_4$ are the same.

The weight vector w to be used for combining the set of probabilistic plant models is calculated using the posterior probability distributions of the automatic operation parameters θ, as shown in the above Expression (6). For this reason, in a case where the probability values of the posterior probability distributions of the four automatic operation parameters $\theta_1$ to $\theta_4$ are the same as shown in FIG. 5B, the weight vectors w with respect to the probabilistic plant models achieving the expected values appended with the reference symbols L1 to L4 shown in FIG. 5A become the same. The combined probabilistic plant models obtained using the above weight vector w has expected values denoted by a curved line appended with a reference symbol L11 shown in FIG. 5C.

Figure 6A:
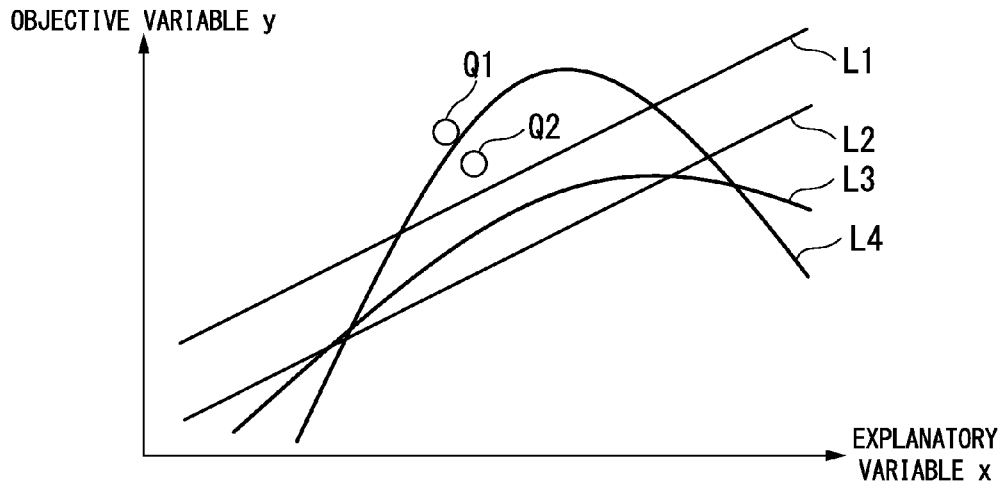
FIGS. 6A to 6C are graphs illustrating operation after the plant model management device according to one embodiment of the present invention is initiated to operate.
Figure 6B:
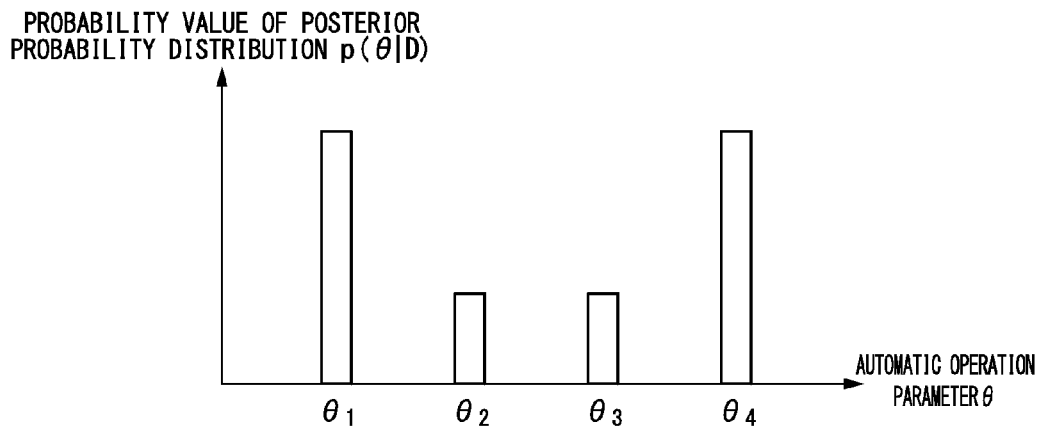
Figure 6C:
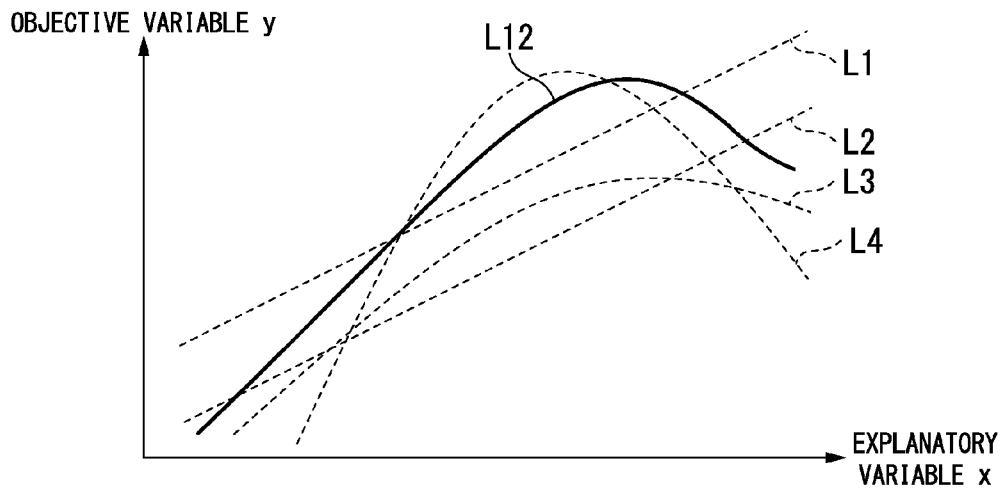

FIGS. 6A to 6C are graphs illustrating operation after the plant model management device 1 according to one embodiment of the present invention is initiated to operate. FIGS. 6A to 6C are similar respectively to FIGS. 5A to 5C. It is assumed here that the plant model management device 1 is initiated to operate after the combined probabilistic plant models achieving the expected values appended with the reference symbol L11 shown in FIG. 5C is obtained, and thereafter learning data appended with reference symbols Q1 and Q2 shown in FIG. 6A are obtained. In this case, there is the increased probability that the probabilistic plant models achieving the expected values appended with the reference symbols L1 and L4 are more correct than the probabilistic plant models achieving the expected values appended with the reference symbols L2 and L3.

Additionally, the posterior probability distributions of the automatic operation parameters θ calculated by the modeling simulation unit 12 reflect the compatibility with learning data, and therefore vary as shown in FIG. 6B. In this case, the weight vector w is updated by the plant model maintenance unit 16 so as to reflect the variation of the posterior probability distributions of the automatic operation parameters θ shown in FIG. 6B. The updated weight vector is output from the plant model maintenance unit 16 to the model combining unit 14. Then, the model combining unit 14 recombines the set of probabilistic plant models using the updated vector weight. Thus, expected values denoted by a curved line appended with a reference symbol L12 shown in FIG. 6C are obtained from the recombined probabilistic plant models. Thus, the combined probabilistic plant models includes multiple models, thereby approximating to a plant model reflecting the property of the plant P as data increases after the operation is initiated.

Figure 7:
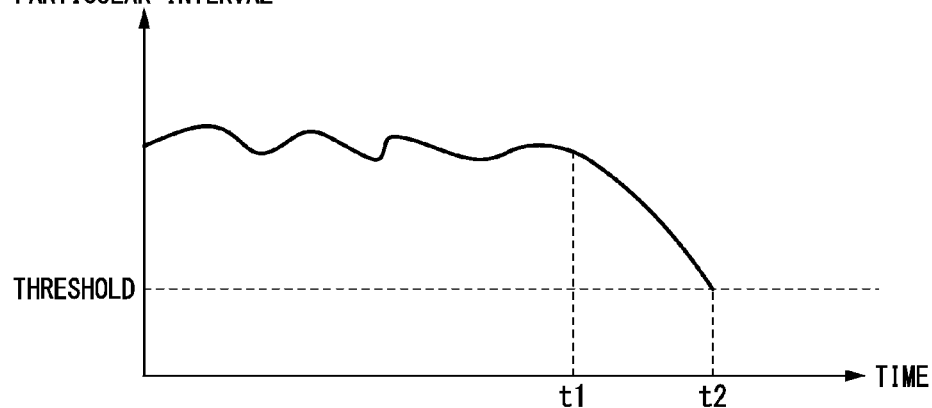
FIG. 7 is a graph illustrating an example of a time variation of an average log-likelihood with respect to an actual value of an objective variable.

Here, there might be a case where every probabilistic plant model becomes inadequate after operation is initiated. This case occurs in a case where a probabilistic plant model is not obtained for every one of the automatic operation parameters θ. FIG. 7 is a graph illustrating an example of a time change in average log likelihood with respect to an actual value of the objective variable. In FIG. 7, a horizontal axis denotes time, and a vertical axis denotes average log likelihood with respect to an actual value of the objective variable (average log likelihood in a particular time interval). Here, a value of average log likelihood is shown in FIG. 7 becomes a value of likelihood is too small.

As shown in FIG. 7, after operation is initiated, the plant model is adjusted as the weight vector w is updated. However, in a case where no adequate probabilistic plant model is left due to a change in property of the plant or the like, the average log likelihood decreases, as shown in FIG. 7 (after time t1). For this reason, the plant model maintenance unit 16 sets an adequate threshold to the average log likelihood. Then, at the time deterioration of the combined probabilistic plant models is detected (time t2 at which the average log likelihood becomes below the threshold), the plant model maintenance unit 16 instructs the modeling simulation unit 12 to regenerate a set of probabilistic plant models. Thus, a newly-combined probabilistic plant models is introduced by the reconfiguration of a set of probabilistic plant models, thereby enabling automatic maintenance.

Figure 8:
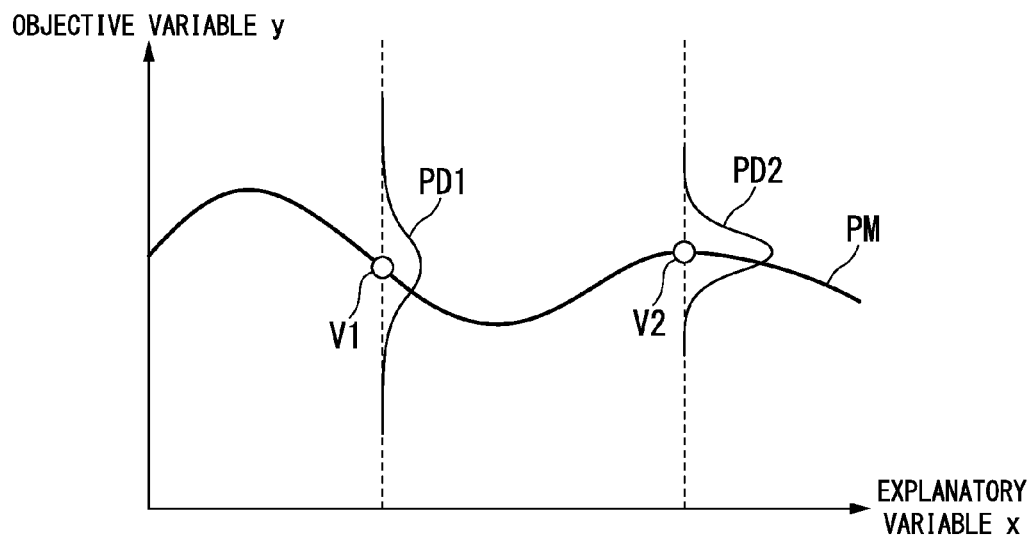
FIG. 8 is a graph illustrating a combined probabilistic plant models to be generated by the plant model management device according to one embodiment of the present invention.

FIG. 8 is a graph illustrating the combined probabilistic plant models to be generated by the plant model management device 1 according to one embodiment of the present invention. In FIG. 8, a horizontal axis denotes an explanatory variable, and a vertical axis denotes an objective variable. Additionally, a curved line appended with a reference symbol PM denotes outputs of a conventional plant model. The conventional plant model PM has an input-output property where an explanatory axis x is one-to-one associated with an objective variable y.

On the other hand, the combined probabilistic plant models to be generated by the plant model management device 1 of the present embodiment has an input-output property where a probability distribution available to the objective variable y is associated with the explanatory variable x (such as probability distributions PD1 and PD2 shown in FIG. 8). Here, even if such a combined probabilistic plant models is used, a plant model similar to the conventional model PM can be obtained as long as the objective variable y with the highest probability value (such as V1 and V2 shown in FIG. 8) is used.

As explained above, according to the present embodiment, the modeling simulation unit 12 generates, using the input prior probability distribution of the automatic operation parameter θ, posterior probability distributions of the automatic operation parameters θ and a set of probabilistic plant models. Then, the model combining unit 14 combines the generated set of probabilistic plant models, using the generated posterior probability distributions of the automatic operation parameters θ. Thus, it is possible to omit conventionally required work, such as careful consideration of parameters based on highly-specialized knowledge. Therefore, it is possible to easily generate a plant model, thereby reducing the burden on the system user who generates such a plant model.

Although device and method for managing a plant model according to one embodiment of the present invention have been explained above, it is apparent that the present invention is not limited to the above embodiment, and may be modified and changed without departing from the scope and spirit of the invention.

For example, the plant model management device 1 explained in the above embodiment has: a configuration that performs the "model generation operation" (the modeling simulation unit 12, the modeling unit 13, and the model combining unit 14); a configuration that performs the "prediction calculation operation" (the prediction unit 15); and a configuration that performs the "model maintenance operation" (the plant model maintenance unit 16). However, the prediction unit 15 and the plant model maintenance unit 16 may be excluded from the plant model management device 1, so that only the "model generation operation" is performed.

Additionally, the probabilistic plant model may be configured not only by an objective variable, but also by the shape of p(y, x) for simultaneously modeling an explanatory variable. Further, for the purpose of online updating, the probabilistic plant model may be output along with a probability distribution concerning an estimation parameter for a particular model estimated by the modeling unit 13. In this case, the probability distribution concerning the estimation parameter is updated by the plant model maintenance unit 16.

Moreover, in a case where the posterior probability distribution with respect to the automatic operation parameter θ can be calculated analytically without simulation, the modeling simulation unit 12 may be replaced with any functional block having a function of estimating a posterior distribution of the automatic operation parameter θ. In this case, for example, an analytical posterior distribution approximation method, such as the Laplace approximation method or the Variational Bayes method, may be used.

Additionally, the plant model management device 1 explained in the above embodiment has such a configuration that the modeling simulation unit 12 is provided separately from the modeling unit 13. However, a configuration may be such that the modeling simulation unit 12 is integrated with the modeling unit 13. Further, the modeling unit 13 generates a probabilistic plant model every time an automatic operation parameter θ is output from the modeling simulation unit, and calculates a likelihood with respect to the automatic operation parameter θ, thereby causing it to be likely to increase the load thereon. For this reason, a configuration may be such that multiple modeling units 13 are provided in parallel to the modeling simulation unit 12. Alternatively, a configuration may be such that the modeling unit 13 is excluded from the plant model management device 1, so that the modeling unit 13 is implemented as a separate device.

The meanings of the "probability distribution", the "prior probability distribution", the "posterior probability distribution", the "likelihood", and the "probabilistic plant model" are as follows.

The "probability distribution" means a function that gives a probability that an actual value of a concerned variable will occur. In a case where the concerned variable is a continuous value such as a real number, the probability distribution is given as a probability density function. However, in the present specification, no distinction is made between a case where the concerned variable is continuous and a case where the concerned variable is discrete.

The "prior probability distribution" means a function that gives a probability of an actual value of a concerned variable in a state where no data is obtained. The "prior probability distribution" is denoted as p(A) where A denotes a concerned variable.

The "posterior probability distribution" means a function that gives a probability of an actual value of a concerned variable after data is obtained. The "posterior probability distribution" is denoted as p(A|D) using a conditional probability, where A denotes a concerned variable, and D denotes the obtained data.

The "likelihood" means a generation probability of already-obtained data on a particular probability distribution. For example, in a case where a variable A is a parameter defining a probability distribution concerning generation of obtained data D, a likelihood of the variable A with respect to the obtained data D is p(D|A). This is also called a likelihood function because the obtained data D is ascertained, and the likelihood p(D|A) is the function of the variable A. Here, according to the Bayes' theorem, the posterior probability distribution is proportionate to a product of the prior probability distribution and the likelihood, that is, p(A|D)∝o(D|A)p(A). When the right side is normalized in a domain, the posterior probability distribution can be obtained.

The "probabilistic plant model" means a function that gives a conditional probability distribution of a predicted value of an objective variable y when an explanatory variable x is obtained, and is denoted as p(y|x). A conventional plant model can be called a "deterministic plant model" because an output is uniquely defined with respect to a particular explanatory variable. On the other hand, regarding the probabilistic plant model, outputs with respect to a particular explanatory variable are expressed by a probability distribution. Even in the probabilistic plant model, a predicted value similar to one obtained from the deterministic plant model can be obtained as long as calculation of expectation or mode is performed.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device which includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

What is claimed is:

1. A plant model management device comprising:
   a generation unit configured to
      receive a first set of prior probability distributions of a first set of automatic operation parameters, the first set of automatic operation parameters defining a condition required for modeling a plant model, and the plant model being a model based on data concerning a plant, and
      generate a first set of posterior probability distributions of the first set of automatic operation parameters and a first set of probabilistic plant models based on the first set of prior probability distributions, the first set of posterior probability distributions reflecting compatibility with learning data, and the learning data being past time-series data concerning a first explanatory variable and a first objective variable; and
   a combining unit configured to combine the first set of probabilistic plant models using the first set of posterior probability distributions to generate a first plant model.

2. The plant model management device according to claim 1, further comprising:
   a prediction unit configured to calculate, using the first plant model, a first predicted value of a second objective variable with respect to a second explanatory variable, and a first probability distribution of the first predicted value.

3. The plant model management device according to claim 2, further comprising:
   a maintenance unit configured to
      verify validity of the first plant model using the first probability distribution and a first actual value of the second objective variable,
      update a first weight used to a second weight in a case that the first plant model is determined to be valid, the first weight being used for the combining unit to combine the first set of probabilistic plant models, and
      cause the combining unit to recombine the first set of probabilistic plant models using the second weight to generate a second plant model.

4. The plant model management device according to claim 3, wherein the prediction unit is configured to:
   calculate, using the second plant model, a second predicted value of the second objective variable and a second probability distribution of the second predicted value.

5. The plant model management device according to claim 3, wherein the maintenance unit is configured to, in a case that the first plant model is determined to be invalid, cause the generation unit to
   receive a second set of prior probability distributions of a second set of automatic operation parameters, and
   generate a second set of posterior probability distributions of the second set of automatic operation parameters and a second set of probabilistic plant models based on the second set of prior probability distributions, the second set of posterior probability distributions reflecting compatibility with learning data, and
   the combining unit is configured to combine the second set of probabilistic plant models using the second set of posterior probability distributions to generate a third plant model.

6. The plant model management device according to claim 2, further comprising:
   an input/output unit configured to receive the first set of prior probability distribution and output the first set of probability distributions.

7. The plant model management device according to claim 1, wherein the generation unit comprises:
   a modeling unit configured to
      generate the first set of probabilistic plant models using the learning data and
      calculate a first set of likelihoods with respect to the first set of automatic operation parameters; and
   a modeling simulation unit configured to
      receive the first set of prior probability distributions, output the first set of automatic operation parameters sequentially to the modeling unit to obtain the first set of probabilistic plant models, and generate the first set of posterior probability distributions based on the first set of likelihoods.

8. A plant model management method comprising:

receiving a first set of prior probability distributions of a first set of automatic operation parameters, the first set of automatic operation parameters defining a condition required for modeling a plant model, and the plant model being a model based on data concerning a plant, and generating a first set of posterior probability distributions of the first set of automatic operation parameters and a first set of probabilistic plant models based on the first set of prior probability distributions, the first set of posterior probability distributions reflecting compatibility with learning data, and the learning data being past time-series data concerning a first explanatory variable and a first objective variable; and combining the first set of probabilistic plant models using the first set of posterior probability distributions to generate a first plant model.

9. The plant model management method according to claim 8, further comprising:

calculating, using the first plant model, a first predicted value of a second objective variable with respect to a second explanatory variable, and a first probability distribution of the first predicted value.

10. The plant model management method according to claim 9, further comprising:

verifying validity of the first plant model using the first probability distribution and a first actual value of the second objective variable, updating a first weight used to a second weight in a case that the first plant model is determined to be valid, the first weight being used for combing the first set of probabilistic plant models, and recombining the first set of probabilistic plant models using the second weight to generate a second plant model.

11. The plant model management method according to claim 10, further comprising:

calculating, using the second plant model, a second predicted value of the second objective variable and a second probability distribution of the second predicted value.

12. The plant model management device according to claim 10, further comprising:

in a case that the first plant model is determined to be invalid, receiving a second set of prior probability distributions of a second set of automatic operation parameters;

generating a second set of posterior probability distributions of the second set of automatic operation parameters and a second set of probabilistic plant models based on the second set of prior probability distributions, the second set of posterior probability distributions reflecting compatibility with learning data; and combining the second set of probabilistic plant models using the second set of posterior probability distributions to generate a third plant model.

13. The plant model management device according to claim 8, wherein generating the first set of posterior probability distributions and the first set of probabilistic plant models comprises:

generating the first set of probabilistic plant modes using the learning data;

calculating a first set of likelihoods with respect to the first set of automatic operation parameters; and generating the first set of posterior probability distributions based on the first set of likelihoods.

14. A method comprising:

sampling a first set of parameters from a first parameter;

generating a first set of probabilistic plant models from the first set of parameters;

calculating a first weight based on the first set of probabilistic plant models;

combining the first set of probabilistic plant models using the first weight to generate a first plant model;

calculating, using the first plant model, a first predicted value of a first objective variable with respect to a first explanatory variable;

verifying validity of the first plant model based on the first predicted value and a first measured value of the first objective variable, the first measured value being a first value of the first objective variable actually measured;

updating the first weight to a second weight in a case that the first plant model is determined to be valid;

recombining the first set of probabilistic plant model using the second weight to generate a second plant model; and calculating, using the second plant model, a second predicted value of the first objective variable.

15. The method according to claim 14, further comprising:

in a case that the first plant model is determined to be invalid, sampling a second set of parameters from a second parameter;

generating a second set of probabilistic plant models based on the second set of parameters;

calculating a third weight based on the second set of probabilistic plant models;

combining the second set of probabilistic plant models using the third weight to generate a third plant model; and calculating, using the third plant model, a third predicted value of the first objective variable.

16. The method according to claim 14, wherein sampling the first set of parameters comprises:

receiving a first prior probability distribution of the first parameter; and sampling the first set of parameters based on the first prior probability distribution.

17. The method according to claim 14, wherein generating the first set of probabilistic plant models further comprises:

generating a first set of likelihoods with respect to the first set of parameters.

18. The method according to claim 17, wherein calculating the first weight comprises:

calculating a first set of posterior probability distributions of the first set of parameters based on the first set of likelihoods; and calculating the first weight based on the first set of posterior probability distributions.

19. The method according to claim 14, wherein calculating the first predicated value comprises:

calculating a first probability distribution of the first predicated value.

20. The method according to claim 19, wherein verifying the validity of the first plant model comprises:

calculating a first likelihood of the first predicted value based on the first probability distribution and the first measured value; and verifying based on the first likelihood whether or not the first plant model is deteriorated.

* * * * *